R. E. HELLMUND.
DAMPING WINDINGS FOR DYNAMO ELECTRIC MACHINES.
APPLICATION FILED JULY 6, 1917.

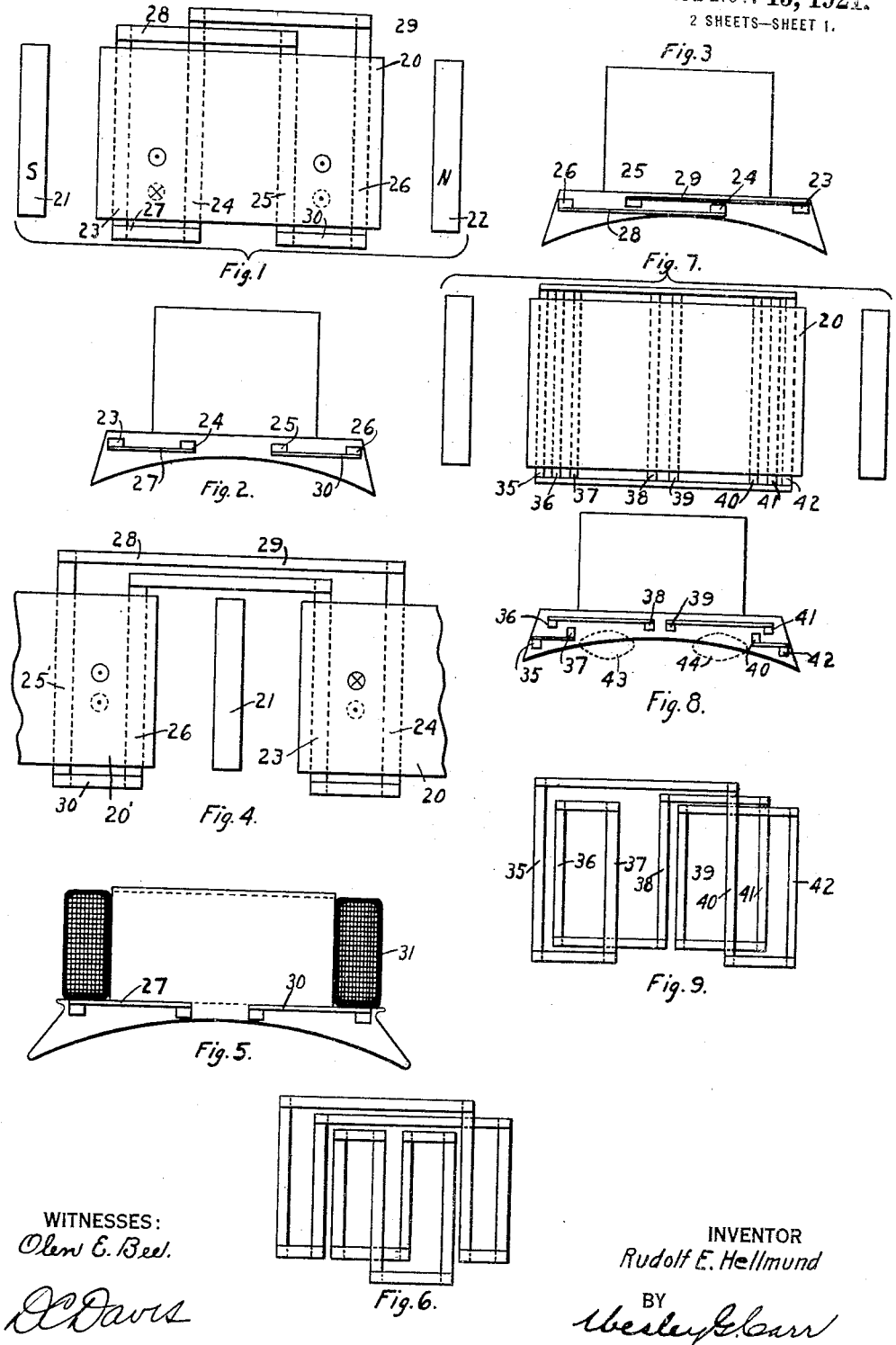

1,396,838.

Patented Nov. 15, 1921.
2 SHEETS—SHEET 2.

WITNESSES:
Olen E. Bee.
O. Davis

INVENTOR
Rudolf E. Hellmund
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

DAMPING WINDINGS FOR DYNAMO-ELECTRIC MACHINES.

1,396,838.   Specification of Letters Patent.   Patented Nov. 15, 1921.

Application filed July 6, 1917. Serial No. 178,951.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Damping Windings for Dynamo-Electric Machines, of which the following is a specification.

My invention relates to means for controlling the flux distribution in dynamo-electric machines of the commutator type, and it has for its object to provide apparatus of the character designated whereby both the main field and the armature-reaction magnetomotive forces may be so controlled during load changes as to prevent or reduce the liability to flashovers and other commutation troubles.

Figure 10:
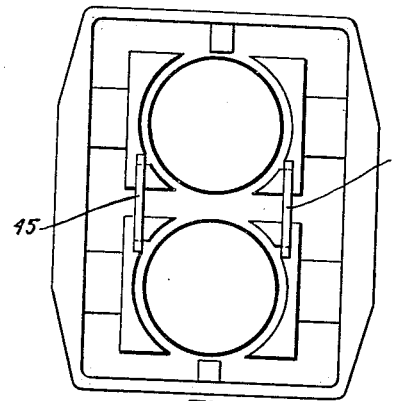

In the accompanying drawing, Figure 1 is a developed plan view of an exciting pole of a dynamo-electric machine and of interpoles associated therewith embodying one form of my invention; Figs. 2 and 3 are side views of an exciting pole embodying the apparatus of Fig. 1 and showing a method of interconnecting the damping conductors thereof; Figs. 4, 5, 7, 8, 11, 12 and 13 are views similar to Figs. 1 and 2 and illustrating different modifications of my invention; Figs. 6, 9, 14 and 15 are simplified diagrammatic views illustrating different methods of interconnecting the conducting members; and Fig. 10 is a diagrammatic view of a dynamo-electric machine of the double-armature type having damping means applied thereto, all in accordance with my invention.

In the operation of dynamo-electric machines of the commutator type, particularly when provided with interpoles, there is a tendency to flashover and other commutation difficulties upon a sudden increase in load current because the armature-reaction or cross flux tends to increase more rapidly than the exciting flux, resulting in abnormal temporary field distortion and a resultant sparking voltage of considerable magnitude under the brushes. This phenomenon arises from the fact that the armature cross flux finds a return path across the pole face, thus traveling entirely upon a laminated path, permitting extremely rapid flux changes. The exciting flux, on the other hand, traverses the solid metal of the yoke and, if interlinked with a shunt-type field winding, experiences a damping effect therefrom. Both of these causes tend to retard rapid changes in the exciting flux and there are thus produced temporary abnormal flux conditions in the commutation zone, upon a load change, which lead to sparking trouble, as fully discussed by myself in an article entitled "Commutation and flashing in railway motors" appearing on page 298, *et seq.*, of the "*Electric Journal*" for July 1915.

In my copending application, Serial No. 173,509, filed June 8, 1917, and assigned to the Westinghouse Electric & Manufacturing Company, I have described and claimed means for controlling the sparking in dynamo-electric machines, particularly railway motors, by the use of a split or bifurcated exciting pole, each portion of which is provided with a shunt-type field winding, said field windings preferably being arranged in parallel relation with each other, and the field winding surrounding the following pole portion embodying more turns than that surrounding the leading pole portion. With a machine of this type, the armature crossfield flux tends to traverse the following pole portion in one direction and the leading pole portion in the other direction. Thus, upon a change in the armature cross flux, the electromotive forces induced in the shunt-type exciting field windings of the two portions of the exciting pole piece are mutually additive in the local circuit embodying said field windings, and a pronouced damping action is opposed to changes in the crossfield flux. Said two shunt-type field windings, on the other hand, are traversed by the exciting flux in the same direction and they, therefore, operate in parallel with respect to the electromotive forces set up by changes in the exciting flux, being able to discharge only through the armature of the machine. Thus the damping effect of said shunt-type field windings is more pronounced with reference to changes in the cross-field flux than to changes in the exciting flux, and temporary abnormal distortion is obviated. The fact that the shunt-type field winding surrounding the following pole portion contains more turns than the shunt-type field winding surrounding the leading pole portion results in the development of a more pronounced damping action thereby, upon a change in the exciting field flux. This effect tends to distort the exciting field flux forward, upon an increase in the load current, in opposition to the inherent tendency of the armature reaction to cause a backward distortion in the exciting flux of a motor on a load increase.

In the present application, I disclose apparatus which, in general, operates in a similar manner to that disclosed in the above-mentioned application but said apparatus preferably takes the form of damping grids embedded in or near the pole faces, whereby a structure of greater simplicity, effectiveness and wider field of application is provided.

Referring to the drawing for a more detailed understanding, I show the face of the exciting pole of a dynamo-electric machine at 20 in Fig. 1, said pole face being flanked, on its respective sides, by interpoles 21 and 22, the interpole 21 being south, as indicated by the letter S, and the interpole 22 being north, as indicated by the letter N. Four conductors 23, 24, 25 and 26 are embedded in the face of the exciting pole 20 and said conductors are suitably interconnected by members 27, 28, 29 and 30 so that the electromotive forces induced in the conductors 23 and 24 by a change in the exciting flux is opposed by the electromotive force induced in the conductors 25 and 26 by the same flux change. The armature cross flux, on the other hand, finds a return path across the face of the pole 20, passing in between the conductors 23 and 24 and outward between the conductors 25 and 26 (Fig. 2). Thus, the loop produced by the conductors 23, 24 and 27 is traversed by the armature cross flux in the opposite direction from the loop produced by the conductors 25, 26 and 30 and, since said loops are connected together in a reverse sense, the electromotive forces induced therein by a change in the armature cross flux are additively combined, setting up a strong circulating current and opposing a pronounced damping action to changes in said cross flux. The structure thus shown in plan view in Fig. 1 and in front and rear elevation in Figs. 2 and 3, respectively, is simple and rugged in nature and, furthermore, is associated with the exciting pole piece as a unit, so that it may be removed with the pole piece for inspection and repair and so that the exciting pole pieces themselves may be removed from the dynamo-electric machine without the disconnection of portions of the damping grids.

A similar effective damping action may be produced with the structure shown in Fig. 4, wherein an exciting pole 20 carries damping conductors 23 and 24, and an adjacent exciting pole 20' carries damping conductors 25' and 26', said conductors being interconnected, as in the arrangement of Fig. 1, and the operation being the same. The structure of Fig. 4 is open to the objection that, if it be desired to remove an exciting pole from the machine, it is necessary to disconnect the end connectors 28' and 29'.

Referring to the form of my invention shown in Fig. 5, the end connectors 27 and 30 may be so disposed as to be in the plane of the inner face of the exciting pole winding, thereby forming a support therefor, as indicated, the exciting winding being indicated in section at 31—31.

If a more accurate control of the various fluxes be desired, a plurality of damping loops may be disposed across the pole face and interconnected as shown in Fig. 6 so as to obtain the same effect as that hitherto pointed out to any desired degree in any portion of the pole face.

With the apparatus thus far disclosed, the building up of both the main field fluxes and the armature cross field fluxes may be so retarded as to reduce the self-induction of a dynamo-electric machine to a vary small value, so that large current rushes are permitted upon the restoration of power, with serious damage. It is desirable, therefore, that the damping action upon the cross-field flux be localized in the horns of the exciting poles where it exerts the most pronounced action in distorting the main field and causing a strong field in the commutating zone. The damping device should produce a much less pronounced action in the central portions of the main pole face, thus permitting considerable self-induction, due to the armature flux and beneficially increasing the self-induction of the motor, as a whole. To this end, I may employ the damping structure shown in Figs. 7, 8 and 9. A main pole piece 20 is provided with damping bars 35 to 42, inclusive, said bars being interconnected at the ends, as indicated in Figs. 8 and 9. The conductors 35 and 37 produce a damping loop of relatively narrow width and near the pole face in one horn, and the conductors 40 and 42 produce a damping loop of similar relatively narrow width adjacent the pole face at the other horn. The conductors 36 and 38 together form a damping loop embracing substantially one-half the pole width at some distance back from the pole faces and the conductors 39 and 31 produce a similar damping loop for the remaining half of the pole piece. Thus the armature field fluxes are enabled to establish magnetic fields at the central portions of the main pole face, as indicated by dotted lines 43 and 44. A pronounced advantage of the structure thus shown is that the full cross-field fluxes passing between the bars 37 and 38 assist in reducing the voltage that produces current flow through the bars 35 and 37.

A simple and extremely useful application of my invention is shown in Fig. 10, the damping or compensating apparatus comprising grid members 45 and 46 shown applied to a motor of the twin-armature type, as illustrated on page 447 of the "*Electric Journal*" for 1915.

Figure 11:
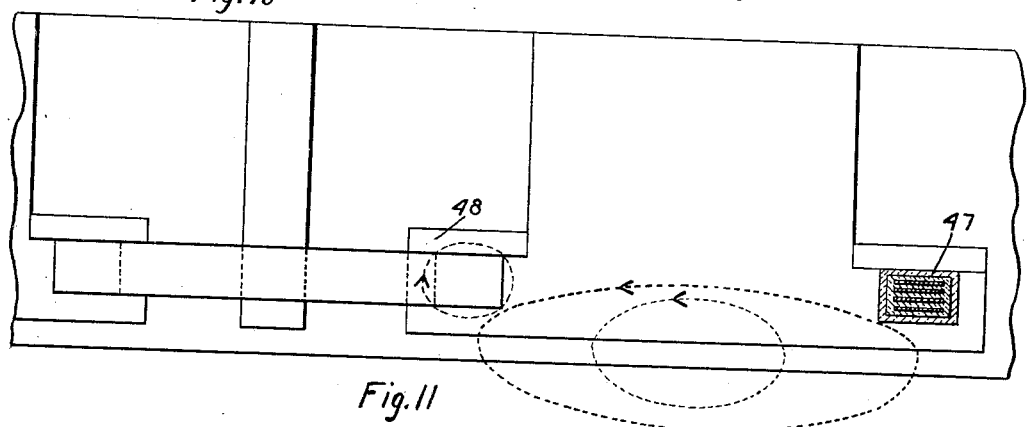

If it be desired to still further increase the self-induction of the motor, in order to prevent current rushes, damping grids or conductively energized compensating members may be entirely embedded in the body of the main exciting poles, as indicated in Fig. 11. Compensating members 47—47 are shown bridging across from one exciting pole horn to the next adjacent horn, said members being introduced from the back of the pole horns and then being inclosed by cover members 48 of magnetic material so as to increase the inductance of the compensating path.

Figure 12:
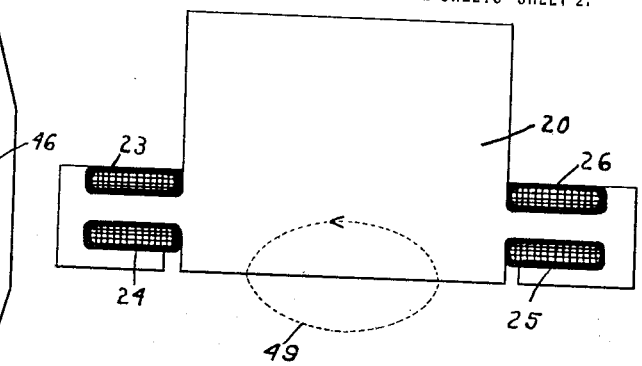

Fig. 12 shows still another method of carrying out my invention. Conductively or inductively energized compensating windings 23—24 and 25—26 are applied to an exciting pole 20 and are mutually interconnected in the manner indicated in Fig. 1, the conductors 23 and 26 lying at the back of the horns, whereas the connectors 24 and 25 lie at the front of the respective horns. The tendency of the cross field flux being to enter at the sides of the main pole piece, as well as at the front face thereof, an effective damping action is in this way produced and, at the same time, the cross-field flux is able to produce an inductive effect at the center of the main pole face, as indicated by a dotted loop 49.

Figure 13:
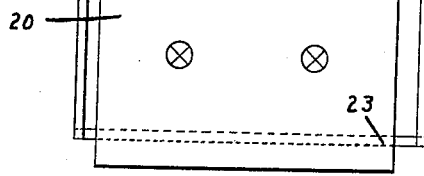

Up to this point, I have disclosed damping structures which are symmetrical with respect to the exciting pole, thus affecting the magnitude of the distorted flux but not affecting the angular location thereof. In Fig. 13, I show a damping structure similar to that in Fig. 1 except that the conductors 23 and 24 embrace a much wider polar span than do the conductors 25 and 26. The direction of rotation is indicated by an arrow 50 so that, in a motor, the distortion produced by the armature reaction would be toward the left, tending to produce a strong field under the toe of the following brush. The fact that the conductors 23 and 24 embrace a much wider polar span, however, results in a much fuller interlinkage thereof with the exciting flux and thus a more pronounced choking action is exerted upon the exciting flux in the following horn than in the leading horn, just as in my copending application above referred to. Thus, the tendency of the damping device is to shift the exciting flux forward, neutralizing the normal backward distorting tendency, the damping device itself operating both upon the cross flux and the main exciting flux, in distinction to previous forms of my invention which operate only upon the cross flux.

Figure 14:
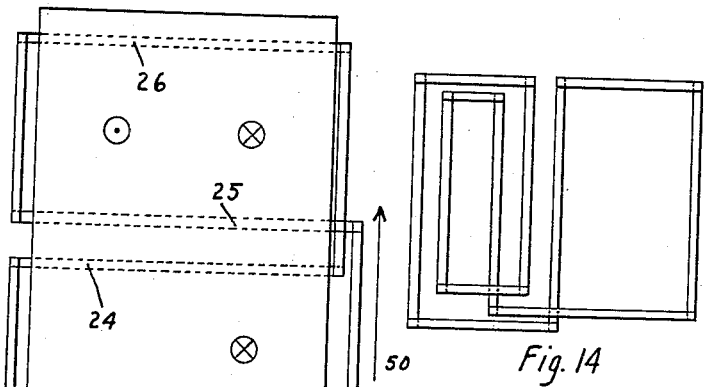

If desired, the greater number of interlinkages under the following horn may be obtained as shown in Fig. 14 by providing more turns in the left-hand portion of the grid than in the right-hand portion thereof, both portions of the damping device having equal polar spans.

Figure 15:
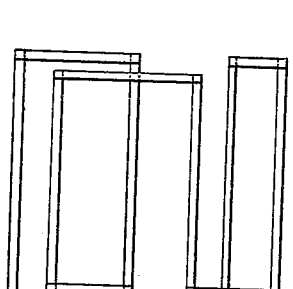

The structure of Fig. 15 is similar to that of Fig. 14 in that more damping turns are provided under the following horn than under the leading horn but said turns are shown distributed in order to produce more accurate compensation.

While I have shown my invention in a plurality of forms, it will be obvious to those skilled in the art that it is not so limited but is susceptible of various minor changes and modifications without departing from the spirit thereof and I desire, therefore, that only such limitations shall be placed thereupon as are imposed by the prior art or as are specifically set forth in the appended claims.

I claim as my invention:

1. The combination with a dynamo-electric machine of the commutator type provided with means for producing exciting poles, of a conducting member surrounding a pole horn which tends to become saturated as the load current on said dynamo-electric machine increases, a conducting member surrounding a pole horn which tends to have its exciting flux reduced because of distortion as the load current increases, and means for connecting said conducting members in series relation so that the electromotive forces induced therein by changes in the exciting flux are differentially combined while electromotive forces induced therein by changes in the cross flux are additively combined, the conducting member surrounding the horn whose flux tends to increase with an increase in load current interlinking with the exciting flux more times than the remaining conducting member.

2. The combination with a dynamo-electric machine of the commutator type provided with exciting field pole pieces, of means for equalizing the distribution of flux over the field pole face comprising damping windings mounted thereon having a greater number of turns under that portion of the pole face toward which the flux tends to move under load conditions and having a smaller number of turns under that portion of the pole face from which the flux tends to move under load conditions, all of said windings being connected together electrically.

3. The combination with a generator of the commutator type provided with exciting field pole pieces, of damping windings mounted thereon comprising coils of a relatively large number of turns mounted adjacent to the trailing tips of the pole pieces and coils of a relatively smaller number of turns mounted adjacent to the leading tips of the pole pieces, said coils being connected in series relationship.

4. The combination with a motor of the commutator type, provided with exciting field pole pieces, of damping windings mounted thereon, comprising coils of a relatively small number of turns mounted adjacent to the trailing tips of the pole pieces and coils of a relatively larger number of turns mounted adjacent to the leading tips of the pole pieces, said coils being connected in series relationship.

In testimony whereof, I have hereunto subscribed my name this 28th day of June, 1917.

RUDOLF E. HELLMUND.